E. PECKHAM.
Manufacture of Iron and Steel.

No. 149,787.          Patented April 14, 1874.

Witnesses          Inventor.

UNITED STATES PATENT OFFICE.

EDGAR PECKHAM, OF ANTWERP, NEW YORK.

IMPROVEMENT IN THE MANUFACTURE OF IRON AND STEEL.

Specification forming part of Letters Patent No. 149,787, dated April 14, 1874; application filed March 4, 1874.

*To all whom it may concern:*

Be it known that I, EDGAR PECKHAM, of Antwerp, Jefferson county, New York, have invented certain new and useful Improvements in the Manufacture of Iron and Steel, and in furnaces to be used therein, of which the following is a specification:

My present improvements are based upon the invention for which Letters Patent of United States, No. 143,637, were issued to me October 14, 1873; and the furnace herein shown is adapted for the carrying out of the process described in said Letters Patent.

The first part of my inventions relates to the construction and arrangement of the puddling or heating furnaces; and it principally consists in combining with the main hearth an upper hearth, to be used as a flux-hearth, for melting flux for the lower or main hearth, the two hearths being connected, and communicating in such manner that the main hearth may be supplied from time to time, or as occasion demands, with melted flux from the upper hearth.

Figure 1:
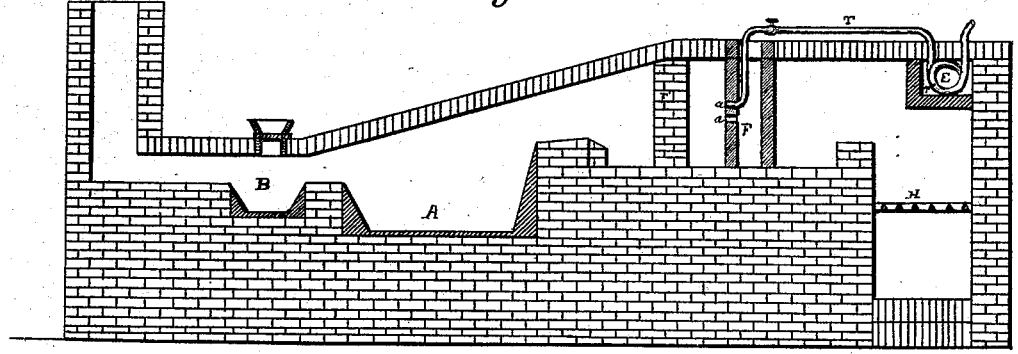
Figure 2:
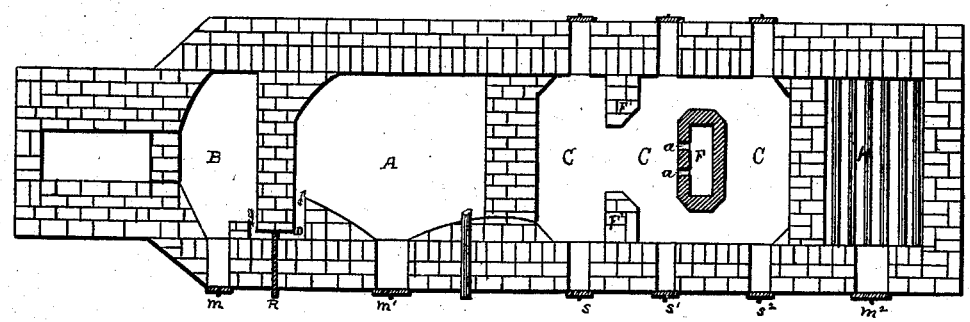

In the accompanying drawing, Figure 1 is a longitudinal central section of a puddling or heating furnace containing my improvements. Fig. 2 is a longitudinal horizontal section of the same.

A is the main hearth, constructed in any ordinary or suitable manner. Beyond the main hearth, and between it and the chimney-flue, is an auxiliary hearth, B, raised somewhat above the hearth A, and designed to be used as the flux-hearth, for melting the flux which afterward is used in the main hearth. The two hearths are connected by a passage, D, preferably formed, as shown, in the side wall of the furnace, so as to be, in a measure, shielded from the direct action of the heat. This passage is provided with a valve or damper, R, by which the flow of flux from the upper to the lower hearth can be regulated at pleasure.

By the means just described, flux can be used to purify iron or steel during its manipulation, as described in my Letters Patent aforesaid.

Situated between the hearth A and the fire-place H is a gas-chamber, C, in which are certain deflecting or obstructing walls F $F^1$ $F^2$, which serve to intercept the heat or flame in its passage from the fire to the hearth of the furnace, and cause the gases of combustion to become thoroughly mixed and united, and also prevent from passing to the hearth particles of coal, which would injure the quality of the iron or steel. Over the fire-place is located a chamber, E, having in it a pipe or pipes, T, which may be used to heat the blast, or to heat steam, the chamber being perforated so as to admit heat from the fire to more direct contact with the pipes. The superheated steam, or heated air, can be conveyed, as shown, through pipes T' into the interior of the main central deflecting or obstructing wall F, which, for this purpose, is made hollow, and is provided, on its rear face, with discharge-openings $a$, as seen in Fig. 2, through which steam or hot or cold air may be conveyed to and mixed in the gas-chamber with the gases from the fire. S $S^1$ $S^2$ are doors in the gas-chamber, through which any coal or ashes accumulating in said chamber may be removed. $m$ is the door to the flux-hearth; $m^1$, the door to the main hearth; and $m^2$ the door to the fire-place.

The second part of my invention relates to the use of flux in the reheating of iron or steel.

When heating iron or steel in the usual manner, the iron or steel has no protection from the blast, and great care must be taken during the operation, or the iron or steel will be burned; and, if the iron or steel has been burned or overheated during any part of its manipulation, it is liable to crack, and produce unsound iron or steel. By using flux during the operation, in the manner hereinafter described, the iron or steel will be protected from the blast, and will weld up sounder, and be much less liable to be burned than when heated in the usual manner. By the use of the flux in this way, a poor iron may be made to roll out sound.

In carrying out this process, the furnace shown in the drawing can be used in the following manner: Fire being made in the fire-place H, and the furnace being properly heated, the flux to be used, which may consist of any substance—such, for instance, as named in my aforesaid Letters Patent—that will produce a thin liquid cinder, free from impurities, is charged into the flux-hearth B, and, after being melted, a sufficient quantity should be allowed to flow, through the passage D, to the main hearth A, to cover it about two inches deep. This will depend, however, upon the size and dimensions of the iron or steel to be heated. The iron or steel to be heated should then be charged into the furnace, and the operation conducted in the ordinary way or manner.

The amount of melted flux that should be kept in the main hearth will depend upon the size and character of the iron or steel to be heated. The rule should be to use enough flux to cover about one-half of the iron or steel; and, by turning the iron or steel over once in a while, as is customary, it will have a coating or covering of the melted flux to protect it from the blast. The quantity should also be regulated according to the character of the iron or steel. If the iron is rough iron, and contains a large quantity of cinder, it will not be necessary to use as much flux as when the iron is of a more dry nature; and more flux should be used for steel than for iron. The quantity used can be regulated to suit the character of the metal operated on.

The cinder in the main hearth should be drawn off at the end of each heat, and fresh cinder transferred from the flux-hearth to the main hearth. The flux should be charged into the flux-hearth, from time to time, sufficient to keep a certain amount of melted flux constantly on hand in the flux-hearth.

Having now described my invention, and the manner in which the same is or may be carried into effect, what I claim, and desire to secure by Letters Patent, is—

1. In a heating or puddling furnace, the combination, with the main hearth, of an upper flux-hearth, the two being connected by a passage or passages provided with suitable valves or dampers, whereby the flow of the flux through said passage or passages from the upper hearth to the main hearth may be regulated and controlled at pleasure, substantially as shown and set forth.

2. In the process of reheating iron or steel, the employment of flux, substantially in the manner described.

In testimony whereof I have hereunto signed my name this 3d day of March, A. D. 1874.

EDGAR PECKHAM.

Witnesses:
   HENRY R. ELLIOTT,
   E. H. DICK.